US006697955B1

(12) United States Patent
Malik et al.

(10) Patent No.: US 6,697,955 B1
(45) Date of Patent: Feb. 24, 2004

(54) METHOD AND APPARATUS FOR USING AN ENERGY RESERVE TO PROVIDE VOLTAGE TO A POWER FACTOR CORRECTION CIRCUIT IN THE EVENT OF A POWER INTERUPTION

(75) Inventors: Randhir S. Malik, Cary, NC (US); William Hemena, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 516 days.

(21) Appl. No.: 09/620,087

(22) Filed: Jul. 20, 2000

(51) Int. Cl.⁷ .................................................. G06F 1/30
(52) U.S. Cl. ....................................... 713/340; 713/300
(58) Field of Search ................................ 713/300, 340; 307/10.1

(56) References Cited

U.S. PATENT DOCUMENTS 5,216,284 A * 6/1993 Mattes et al. ............... 307/10.1
5,420,790 A * 5/1995 Ravas et al. .................. 701/45
6,043,705 A * 3/2000 Jiang .......................... 327/589
6,222,746 B1 * 4/2001 Kim ............................ 363/89

FOREIGN PATENT DOCUMENTS

JP          10295041 A * 11/1998 ............. H02J/3/18

OTHER PUBLICATIONS

"Power Factor Correction Circuit", IBM Technical Disclosure Bulletin, Mar. 1, 1996, US, pp. 43–46.*

* cited by examiner

*Primary Examiner*—Thomas Lee
*Assistant Examiner*—Paul Yanchus, III
(74) *Attorney, Agent, or Firm*—Sawyer Law Group

(57) ABSTRACT

A power factor correction circuit is disclosed. The power factor correction circuit comprises a converter portion, a boost stage portion coupled to the converter portion, and an energy reserve portion coupled to the boost stage portion, the energy reserve portion for providing a voltage for the power factor correction circuit in the event of an interruption of power to the circuit. Through the use of the circuit in accordance with the present invention, the use of expensive, higher rated circuitry components is avoided. By avoiding the use of expensive higher rated circuitry components a significant reduction in manufacturing costs is achieved.

29 Claims, 5 Drawing Sheets

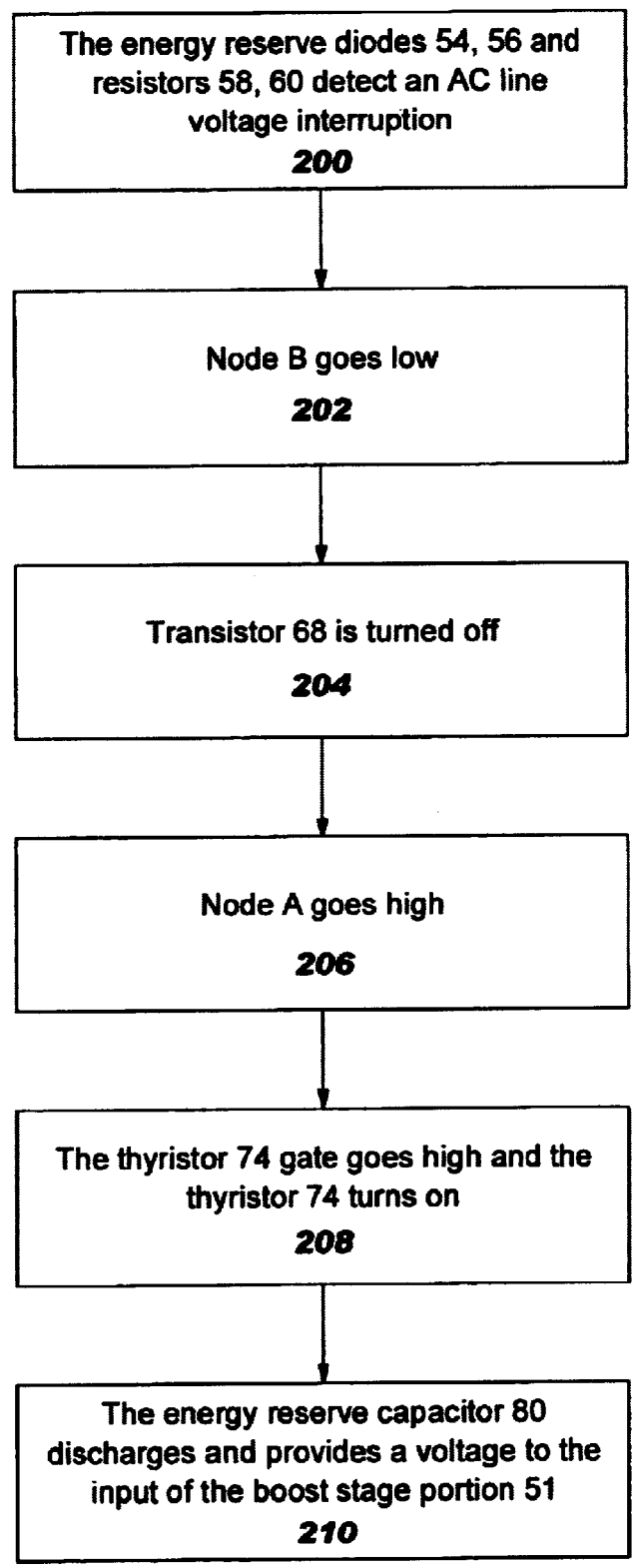

METHOD AND APPARATUS FOR USING AN ENERGY RESERVE TO PROVIDE VOLTAGE TO A POWER FACTOR CORRECTION CIRCUIT IN THE EVENT OF A POWER INTERUPTION

FIELD OF THE INVENTION

The present invention relates generally to processing systems and specifically to a power factor correction circuit for a processing system.

BACKGROUND OF THE INVENTION

Power factor correction (PFC) circuits are commonly used in desktop computers where a high power factor is required. FIG. 1 depicts a conventional PFC circuit configuration 10. The PFC circuit configuration 10 includes a boost stage portion 11 coupled to an isolated DC/DC converter portion 12. The boost stage portion 11 includes an AC line voltage input 13 coupled to a rectifier bridge 14 wherein the rectifier bridge 14 is coupled to a first capacitor 16. The first capacitor 16 is coupled to an inductor 18 wherein the inductor 18 is coupled to a diode 22 and a transistor 24. The transistor 24 is coupled to a pulse width modulator 20 and the diode 22 is coupled to a bulk capacitor 26.

The isolated DC/DC converter portion 12 includes a transistor 28 coupled to a transformer 30 wherein the transformer 30 is coupled to a first diode 32. The first diode 32 is coupled to a second diode 36 and an inductor 34. The inductor 34 is coupled to an output 38 and a capacitor 40. The boost stage 11 develops a high voltage (i.e. 400V) across the bulk capacitor 26 and the isolated DC/DC converter portion 12 converts the high voltage to a lower voltage (for example, 5V) output.

During computer operation, the interruption of the AC line voltage is a relatively common occurrence. Based on these interruptions, it is required that the PFC circuit be capable of providing a regulated output for at least 20 ms. Utilizing a conventional approach, the bulk capacitor 26 is designed to store enough energy to provide regulated outputs at full load for up to 20 ms in the case of an AC line voltage interruption. This requires the implementation of a large (470 micro farad or higher) and relatively expensive bulk capacitor 26. Furthermore, the diodes 32, 36 and the transistor 28 of the isolated DC/DC converter portion 12 must be selected to account for the use of the large bulk capacitor 26. Consequently, the diodes 32, 36 and the transistor 26 of the isolated DC/DC converter portion 12 are higher rated (i.e. more expensive) components.

Accordingly, what is needed is an improved PFC circuit that less expensive than conventional PFC circuits. The circuit should be simple, cost effective and capable of being easily adapted to current technology. The present invention addresses such a need.

SUMMARY OF THE INVENTION

A power factor correction circuit is disclosed. The power factor correction circuit comprises a converter portion, a boost stage portion coupled to the converter portion, and an energy reserve portion coupled to the boost stage portion, the energy reserve portion for providing a voltage for the power factor correction circuit in the event of an interruption of power to the circuit.

Through the use of the circuit in accordance with the present invention, the use of expensive, higher rated circuitry components is avoided. By avoiding the use of expensive higher rated circuitry components a significant reduction in manufacturing costs is achieved.

BRIEF DESCRIPTION OF THE DRAWINGS

FIG. 5 is a flow diagram of the operation of the PFC circuit in accordance with the present invention during an AC line voltage interruption.

DETAILED DESCRIPTION

The present invention relates to power factor correction circuit for a processing system. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The present invention is disclosed in the context of a preferred embodiment. The preferred embodiment of the present invention provides for an improved holdup time during an AC interruption. In accordance with the present invention, the PFC circuit eliminates the need for higher rated output components and allows for the use of lower rated components. Accordingly, the PFC circuit in accordance with the present invention, is less expensive to manufacture than conventional PFC circuits.

Figure 2:
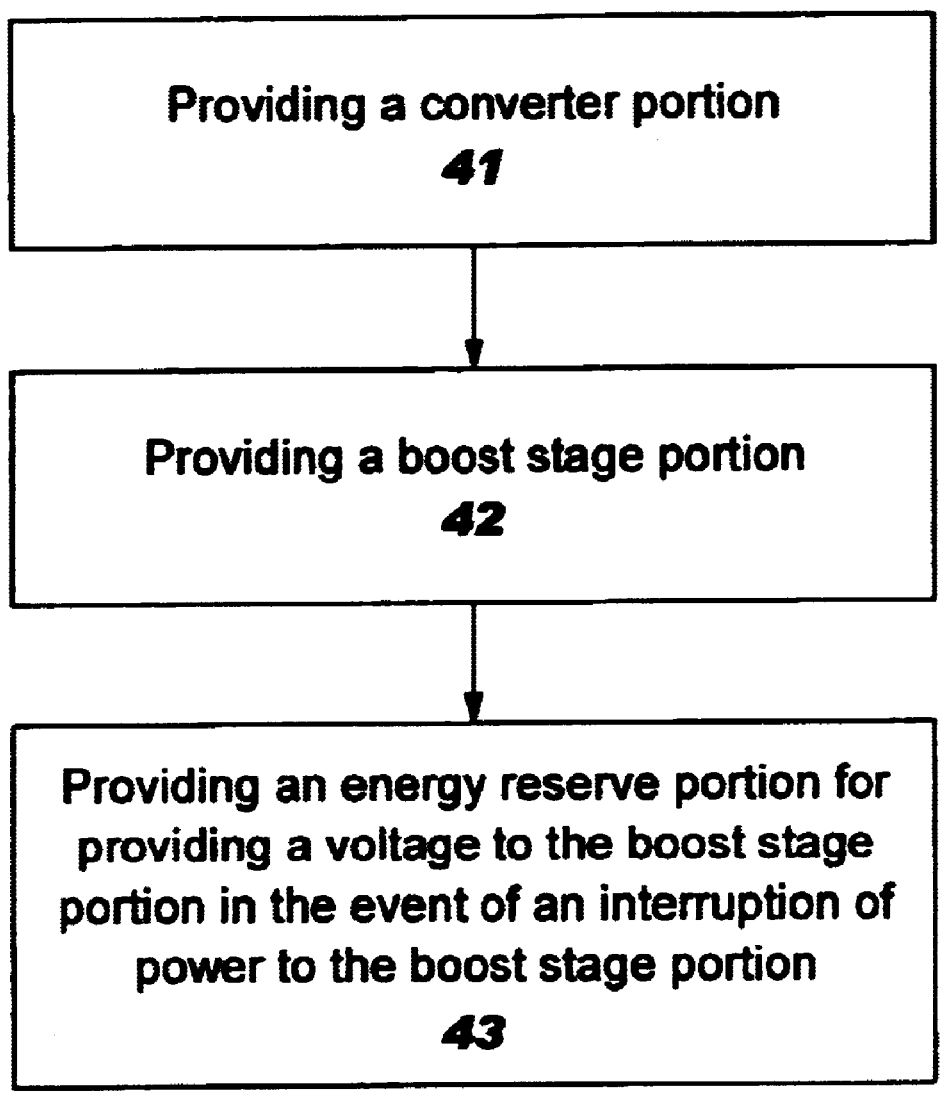
FIG. 2 is a high-level flowchart of the operation of the method in accordance with the present invention.

For a description of the method in accordance with the present invention, please refer to FIG. 2. FIG. 2 is a high-level flowchart of the method in accordance with the present invention. First, a converter portion is provided, via step 41. Next, a boost stage portion is provided, via step 42. Finally, an energy reserve portion is provided for providing a voltage to the boost stage portion in the event of an interruption of power to the boost stage portion, via step 43. Preferably, the energy reserve portion is separate from the boost stage portion.

Figure 1:
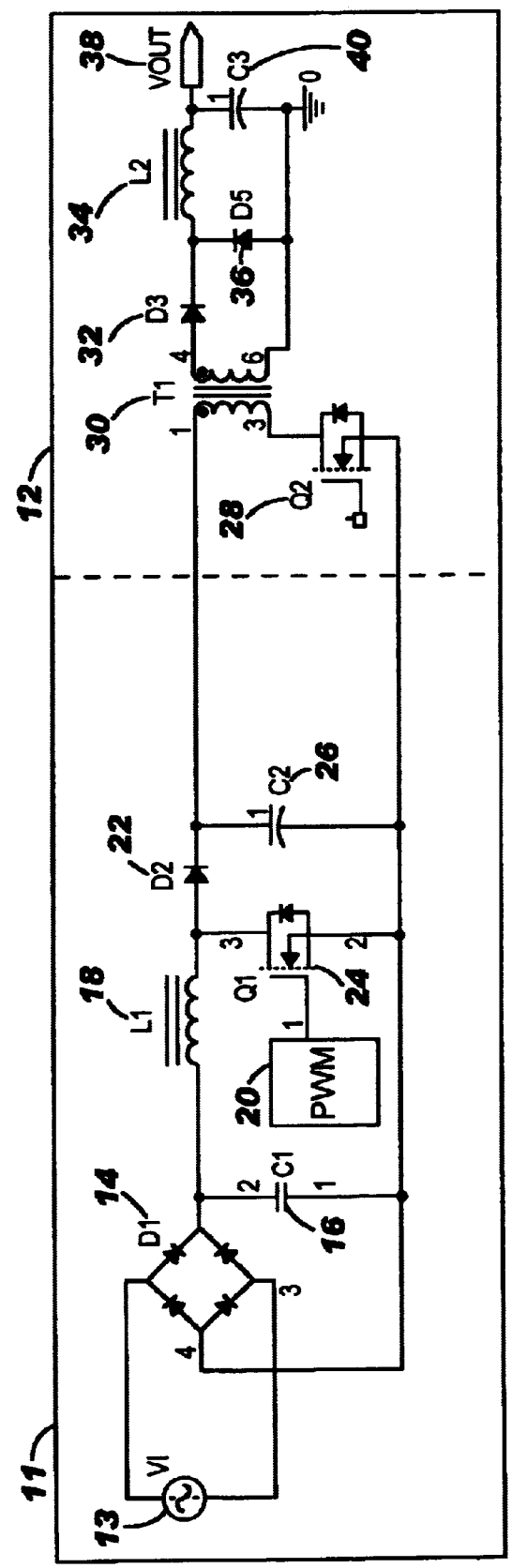
FIG. 1 is a conventional PFC circuit configuration.
Figure 3:
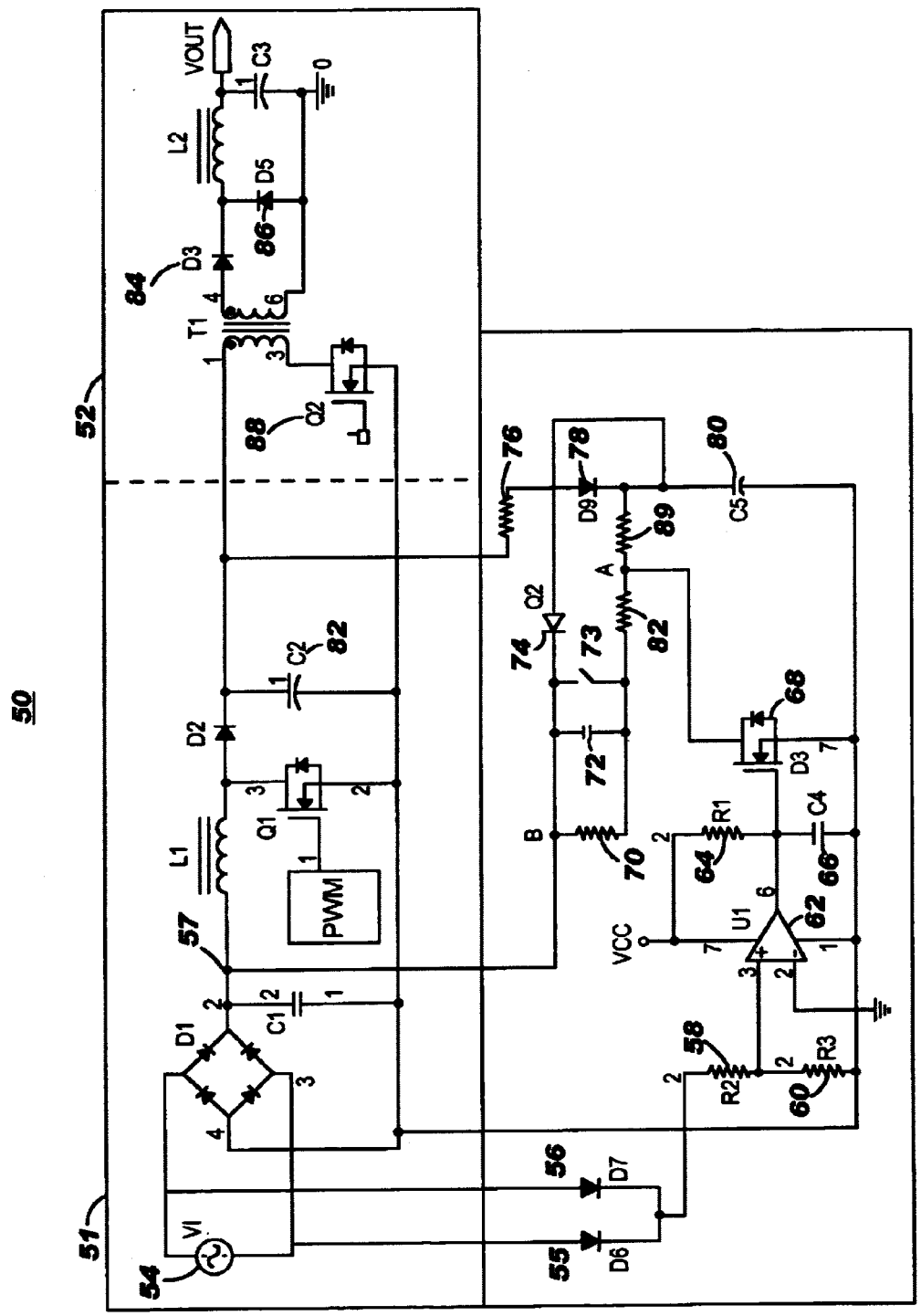
FIG. 3 shows the PFC circuit in accordance with the present invention.

For a description of a PFC circuit in accordance with the present invention, please refer now to FIG. 3. FIG. 3 shows a PFC circuit 50 in accordance with the present invention. The circuit 50 includes a boost stage portion 51, an isolated DC/DC converter portion 52 and an energy reserve portion 53. The boost stage portion 51 and the isolated DC/DC converter portion 52 are similar to those described in FIG. 1. The energy reserve portion 53 includes two diodes 55, 56 coupled to an input 54, wherein the two diodes 55, 56 are coupled to two resistors 58, 60. The two resistors 58, 60 are coupled to a comparator 62, wherein the comparator is coupled to a third resistor 64 and a first capacitor 66. A transistor 68 is coupled to a node A wherein the node A is coupled to a fourth resistor 82 and a fifth resistor 84. The fourth resistor 82 is coupled to a second capacitor 72 wherein the capacitor 72 is coupled to a sixth resistor 70, a thyristor 74, and a node B wherein node B is coupled to an input 57. The fifth resistor 84 is coupled to a third diode 78 and a third (energy reserve) capacitor 80. The third diode 78 is coupled to a seventh resistor 76 and the thyristor 74.

Although the preferred embodiment of the present invention is disclosed in the context of being used in conjunction with a DC/DC converter, one of ordinary skill in the art will readily recognize that a variety of converters could be utilized while remaining within the spirit and scope of the present invention.

Figure 4:
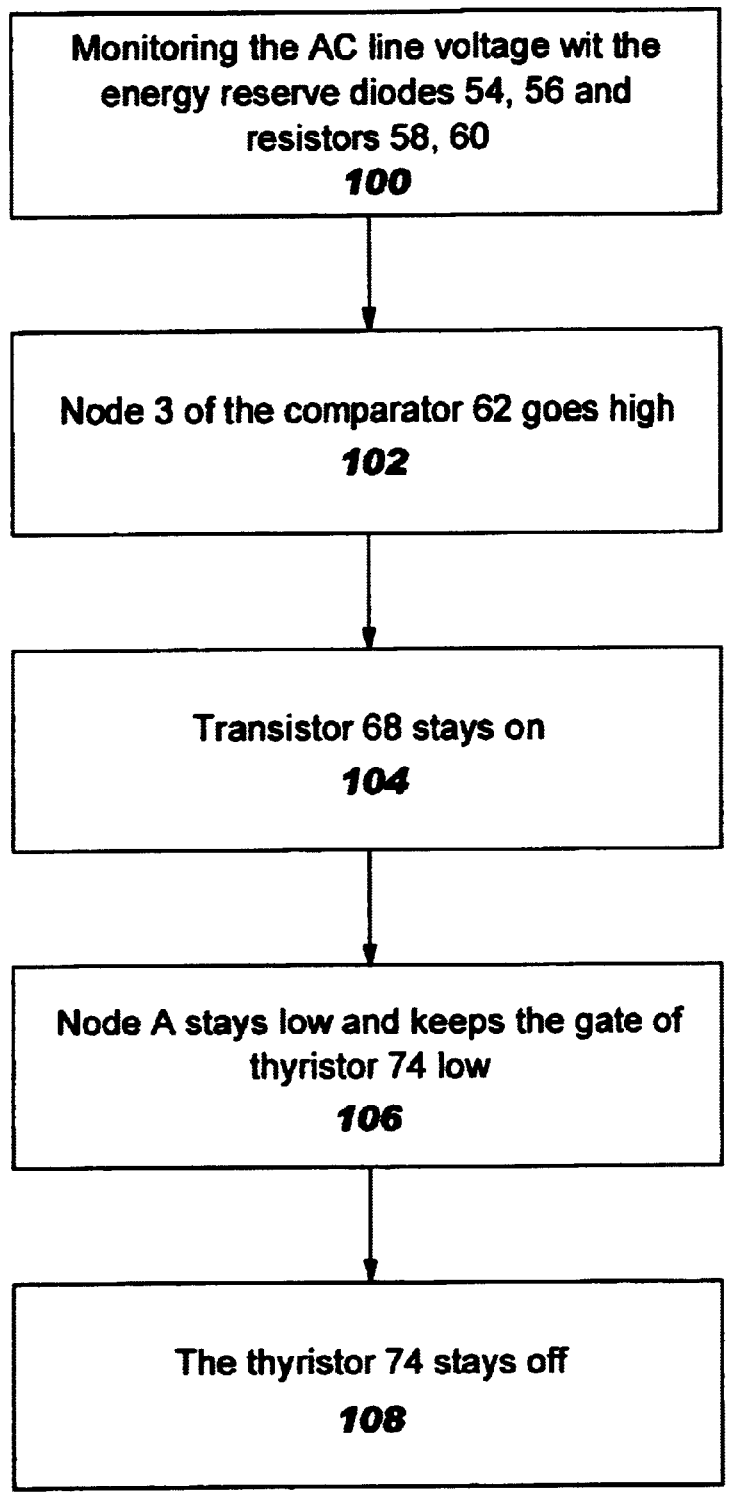
FIG. 4 is a flow diagram of the operation of the of the PFC circuit in accordance with the present invention during normal operation.

For a better understanding the operation of the circuit 50 in accordance with the present invention, please refer to FIG. 4. FIG. 4 is a flow diagram of the operation of the of the PFC circuit in accordance with the present invention during normal operation when the AC is on. Referring to FIGS. 3 and 4 together, first, the line voltage is monitored by the energy reserve diodes 55, 56 and resistors 58, 60, via step 100. Next, since the AC line voltage is on, node 3 of the comparator 62 goes high, via step 102. Transistor 68 then stays on, via step 104. Next, node A stays low and keeps the gate of the thyristor 74 low, via step 106. Finally, the thyristor 74 stays off, via step 108. Accordingly, while the AC voltage is on, the energy reserve capacitor 80 stays fully charged.

For a further understanding of the operation of PFC circuit 50, please refer to FIG. 5. FIG. 5 is a flowchart of the operation of the PFC circuit in accordance with the present invention when the AC line voltage is interrupted. Referring to FIGS. 3 and 5 together, first, the energy reserve diodes 55, 56 and resistors 58, 60 detect an AC line voltage interruption, via step 200. Node B then goes low via step 202. Next, transistor 68 is turned off, via step 204. Node A then goes high, via step 206. Next, the thyristor 74 gate goes high and the thyristor 74 turns on, via step 208. Preferably, resistor 70 and capacitor 72 are selected such that false turn ons of the thyristor are prevented. Finally, the energy reserve capacitor 80 discharges and provides a voltage to the input 57 of the boost stage portion 51, via step 210. Preferably, the energy reserve capacitor 80 discharges enough energy to power the PFC circuit for at least 20 ms.

As the energy reserve capacitor 80 discharges, the boost stage portion 51 keeps the voltage to the isolated DC/DC converter portion 52 constant throughout the duration of the AC line voltage interruption. Because the input 57 of the boost stage portion 51 can operate at a very low voltage level (100V or less) and still maintain a constant bulk voltage level, the energy reserve capacitor 80 can be relatively small (100 micro farads or less). Also, since the boost capacitor 82 is no longer utilized to provide energy to the DC/DC converter for at least 20 ms during an AC line voltage interruption, the boost capacitor 82 can also be relatively small (100 micro farads or less).

Furthermore, since the bulk voltage across the boost capacitor 82 remains normal even during an AC line voltage interruption, the DC/DC converter portion 52 continues to operate in a normal fashion. Because the DC/DC converter portion 52 can continuously operates at a constant voltage during an AC interruption of 20 ms, the DC/DC converter portion 52 components (diodes 84, 86, transistor 88) can be selected without making provisions for a large boost capacitor 82. Accordingly, the components can be of the lower rated, less expensive variety. These include Schottky type diodes as well as low rated MOSFET transistors.

Accordingly, through the use of the circuit in accordance with the present invention, the use of expensive, higher rated circuitry components is avoided. By avoiding the use of expensive higher rated circuitry components a significant reduction in manufacturing costs is achieved.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A power factor correction circuit comprising:

a converter portion;

a boost stage portion coupled to the converter portion; and an energy reserve portion coupled to the boost stage portion, the energy reserve portion comprising at least one capacitor coupled to a thyristor for providing a voltage for the power factor correction circuit in the event of an interruption of power to the power factor correction circuit.

2. The circuit of claim 1 wherein the at least one capacitor provides energy to an input of the boost stage portion via the thyristor.

3. The circuit of claim 1 wherein the capacitance of the at least one capacitor is no greater than 100 micro farads.

4. The circuit of claim 1 wherein the energy reserve portion further comprises means for monitoring an input voltage to the boost stage portion.

5. The circuit of claim 4 wherein the means for monitoring the input voltage of the boost stage portion comprises at least one diode coupled to the boost stage portion, at least one resistor coupled to the at least one diode, and a voltage comparator coupled to the at least one resistor.

6. The circuit of claim 1 wherein the boost stage portion comprises a capacitor wherein the capacitance is no greater than 100 micro farads.

7. The circuit of claim 1 wherein the converter portion comprises at least one low rated transistor and at least one low rated diode.

8. The circuit of claim 7 wherein the at least one low rated diode is a Schottky type diode.

9. The circuit of claim 1 wherein the converter portion comprises a DC/DC converter portion.

10. The circuit of claim 1 wherein the energy reserve portion provides the voltage for at least 20 ms.

11. A power factor correction circuit comprising:

a converter portion;

a boost stage portion coupled to the converter portion, the boost stage portion comprising an input; and an energy reserve portion coupled to the boost stage portion, wherein the energy reserve portion comprises at least one capacitor coupled to a thyristor for providing a voltage to the input of the boost stage portion in the event of an interruption of power for the power factor correction circuit wherein the capacitance of the at least one capacitor is no greater than 100 micro farads.

12. The circuit of claim 11 wherein the energy reserve portion further comprises means for monitoring an input voltage to the boost stage portion.

13. The circuit of claim 12 wherein the means for monitoring the input voltage of the boost stage portion comprises at least one diode coupled to the boost stage portion, at least one resistor coupled to the at least one diode, and a voltage comparator coupled to the at least one resistor.

14. The circuit of claim 11 wherein the boost stage portion comprises a capacitor wherein the capacitance of the capacitor is no greater than 100 micro farads.

15. The circuit of claim 12 wherein the converter portion comprises at least one low rated transistor and at least one low rated diode.

16. The circuit of claim 15 wherein the at least one low rated diode is a Schottky type diode.

17. The circuit of claim 11 wherein the converter portion comprises a DC/DC converter portion.

18. The circuit of claim 11 wherein the energy reserve portion provides the voltage for at least 20 ms.

19. A power factor correction circuit comprising:
   a DC/DC converter portion comprising at least one low rated diode and at least one low rated transistor;
   a boost stage portion coupled to the converter portion wherein the boost stage portion comprises
      an input voltage; and
      a boost capacitor wherein the capacitance of the boost capacitor is no greater than 100 micro farads; and
   an energy reserve portion coupled to the boost stage portion, wherein the energy reserve portion comprises:
      means for monitoring the input voltage of the boost stage portion;
      at least one energy reserve capacitor coupled to a thyristor for providing the input voltage to the boost stage portion for at least 20 ms in the event of an interruption of power to the power factor correction circuit wherein the capacitance of the energy reserve capacitor is no greater than 100 micro farads.

20. The circuit of claim 19 wherein the means for monitoring the input voltage of the boost stage portion comprises at least one diode coupled to the boost stage portion, at least one resistor coupled to the at least one diode, and a voltage comparator coupled to the at least one resistor.

21. The circuit of claim 20 wherein the at least one low rated diode is a Schottky type diode.

22. A method of providing energy to a power factor correction circuit comprising the steps of:
   a) providing a converter portion;
   b) providing a boost stage portion;
   c) utilizing a energy reserve portion comprising at least one capacitor coupled to a thyristor, wherein the energy reserve portion is separate from the boost stage portion, to provide a voltage for the power factor correction circuit in the event of an interruption of power to the power factor correction circuit.

23. The method of claim 22 wherein the boost stage portion comprises an input voltage and step c) further comprises:
   c1) monitoring the input voltage;
   c2) providing the input voltage in the event of an interruption of power to the boost stage portion.

24. The method of claim 23 wherein step c2) further comprises providing the input voltage for at least 20 ms.

25. The method of claim 22 wherein the boost stage portion comprises a capacitor wherein the capacitance of the capacitor is no greater than 100 micro farads.

26. The method of claim 22 wherein the converter portion comprises at least one low rated transistor and at least one low rated diode.

27. The method of claim 26 wherein the at least one low rated diode is a Schottky type diode.

28. The method of claim 22 wherein the converter portion comprises a DC/DC converter portion.

29. A power factor correction circuit comprising:
   a converter portion;
   a boost stage portion coupled to the converter portion; and
   an energy reserve portion coupled to the boost stage portion for providing a voltage for the power factor correction circuit in the event of an interruption of power to the power factor correction circuit, wherein the energy reserve portion comprising:
      at least one capacitor for storing energy;
      a thyristor coupled to the at least one capacitor; and
      a transistor coupled to the thyristor, wherein the thyristor turns on when the transistor is turned off in response to the interruption of power.

* * * * *